Oct. 1, 1935.  R. D. MURO  2,015,761
CLOSING DEVICE OR COVER
Filed Aug. 9, 1933
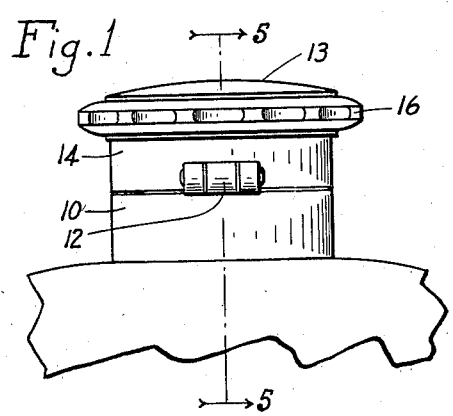
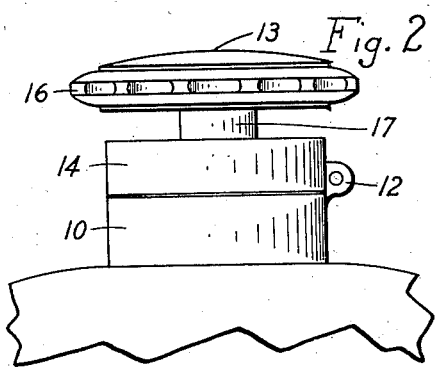
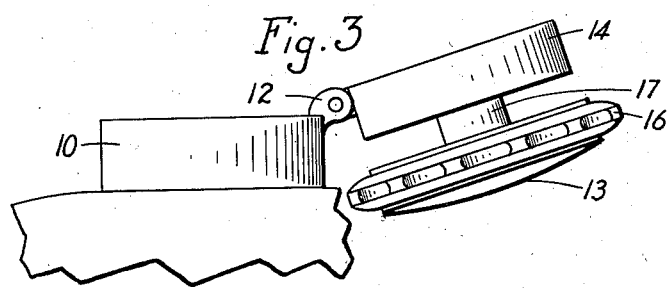
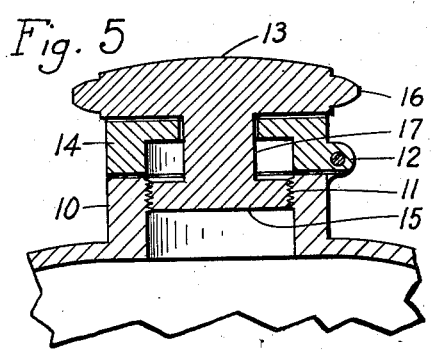
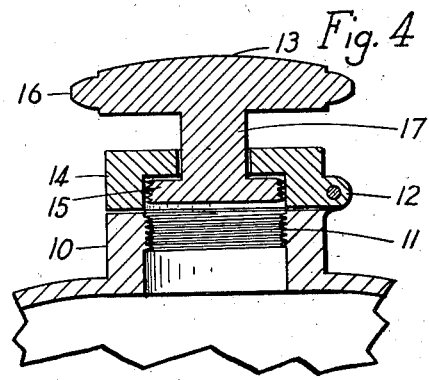
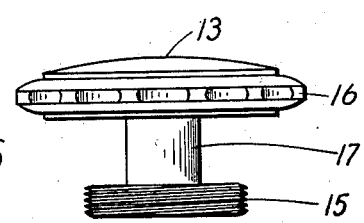
Inventor
Raul Diez Muro
By F. E. Boyce
Attorney Patented Oct. 1, 1935

2,015,761

UNITED STATES PATENT OFFICE 2,015,761

CLOSING DEVICE OR COVER

Raul Diez Muro, Habana, Cuba

Application August 9, 1933, Serial No. 684,347
In Republic of Cuba March 27, 1933

2 Claims. (Cl. 220—32)

This invention refers to screw closing devices, and has for principal object providing a cover for the inlet of tanks or deposits of water and fuel in automobiles. The closing device may also be used as a cover for tubes, pipes, bottles and other receptacles, wherein a hermetic sealing is required.

Closing devices for tanks, deposits, tubes, pipes, and other receptacles containers of liquids and other materials which easily evaporate in order to be efficient and fulfill their purpose must produce a hermetic sealing; it having been found that the screw type of cover has been the most efficient and secure known to the present.

The screw type of covers for receptacles known to the present, however, has the disadvantage that unless the cylinder of the male screw and the groove or channel of the female screw are placed in the proper position, difficulties are met in receiving each other. Another disadvantage is that when the covers or closing means are removed, they may be misplaced, strayed, lost or stolen, this latter being quite frequent in the case of covers used in the water and fuel tanks of automobiles.

The object of this invention, therefore, is to provide a closing device or cover for tanks, deposits, tubes and other receptacles in which the cover is connected to the mouth or inlet of the receptacle or tube by a hinge device, but which by means of a screw plate, housed within the cover, and operated by a handle and shaft device can be screwed and unscrewed to the mouth or inlet of the receptacle.

The results indicated, may be obtained in various manners but a satisfactory means of carrying out my invention, is as explained below in connection with covers as used in water and fuel tanks for automobiles. Such description, however, is merely expositive, as it is not the intention to limit the invention to these classes of covers nor as to the form, details of construction, material or other elements, which may be varied or modified, without departing from the principle of the invention.

The invention particularly as it refers to covers for water or fuel tanks in automobiles, may be properly understood referring to the drawing in which:

Fig. 1 is a perspective view of a cover used in the water or fuel tank of an automobile.

Fig. 2 is a perspective view of a cover as used in water or fuel tank of an automobile showing its position after the handle and rod of the screwing element, have been released.

Fig. 3 is a perspective view of a cover as used in water or fuel tanks, for automobiles, showing its position when the cover has been unscrewed and thrown over the hinge element.

Fig. 4 is a sectional view of the cover showing its position when it is unscrewed.

Fig. 5 is a sectional view of the cover after it has been screwed into place.

Fig. 6 is a perspective detail of the handle, rod and the plate screw element.

In the drawing, the numeral 10 indicates the inlet ring or collar of the receptacle. The inner walls of this collar or ring bear the channel grooves 11, for the male screw element of the cover 13.

The cover 13, which is attached to the inlet collar 10 of the receptacle by a hinge 12 element, consists of lower cylindrical frame 14 of sufficient thickness to provide a socket space for the screw plate 15 which is connected to a superior piece or handle 16 by a rod or shaft 17.

It will be observed that the screw plate 15 is of a larger diameter than the supporting or connecting rod 17. This dispositive and the fact that the screw plate is housed in the lower section of the ring, constitutes one of the principal characteristics of the invention as will be seen in course of this illustration.

There also must be observed, that the diameter of the screw plate 15 is the same as that of the opening of the inlet ring or collar 10, so that when the cover is swung over into a closing position, the male screw element in the screw plate 15 lies directly over the channel grooves 11, of the inlet ring and permits a perfect closing by merely turning the handle 16, which works the screw plate 15.

In order to prevent that the handle 16 be removed from the cover 13, I provide a housing element in the lower cylindrical piece 14 as shown in Figures 4 and 5. This housing constructed in the form of a socket, is of a depth and diameter sufficient to permit the screw plate 15 to work freely in and around and in an up or downward direction.

It is evident that the cover 13 described when properly joined to the inlet ring or collar of any receptacle by a hinge element 12, cannot be lost, strayed or pilfered, and that when placed in position over the inlet collar or ring 10 same can be screwed into position by merely turning the handle 16 which works the screw plate 15 into the grooves 11 in the inlet collar 10. This operation is carried out by turning the handle 16 connected to the rod or shaft 17 which works up and downwardly and in and around within the socket space.

To open the receptacle the only operation necessary is to turn the handle 16 to the reverse thus disconnecting the screw plate 15 from the grooves 11 in the inlet collar ring 10 and then give the cover 13 a sidewise movement against the hinge 12. To close the receptacle, the cover 13 is returned to position, and by merely turning the handle 16 which works the shaft or rod 17 attached to the screw plate 15 permits the latter to enter into the grooves 11 in the inlet collar ring 10 thus producing a perfect sealing.

The description and illustrations represent a preferred form of the invention, that is to say, its adoption to the tanks containing water or fuel in automobiles, but, I repeat, the invention has other applications such as for example in combination with tubes, bottles and other receptacles where it is desired to obtain a perfect closing screw sealing and to avoid that the cover should be misplaced, lost or pilfered.

Having thus described the invention, that which I claim is as follows:

1. In combination, a receptacle provided with a filling opening and having an internally screw threaded collar surrounding said opening, a screw threaded plug adapted to fit in said collar to close the filling opening, a housing cap fitting on said collar and having a recess in its under side of slightly greater diameter and depth than the diameter and depth of the plug to completely receive the plug when unscrewed from the opening, a hinge connecting one side of the housing to the collar, a stem extending from the plug and rotatably mounted centrally of the housing, and a handle on the upper end of said stem.

2. In combination, a receptacle provided with a filling opening and having an internally screw threaded collar surrounding said opening, a screw threaded plug adapted to fit in said collar to close the filling opening, a housing cap fitting on said collar and having a recess in its under side of slightly greater diameter and depth than the diameter and depth of the plug to completely receive the plug when unscrewed from the opening, a hinge connecting one side of the housing to the collar, a stem extending from the plug and rotatably mounted centrally of the housing, and a handle on the upper end of said stem, said stem being of such length that the handle fits tightly against the top of the housing when the plug is screwed home in the collar.

RAUL DIEZ MURO.